US009410456B2

(12) United States Patent
Mavroidakos et al.

(10) Patent No.: US 9,410,456 B2
(45) Date of Patent: Aug. 9, 2016

(54) FILTER ELEMENT WITH A BYPASS DUCT AS WELL AS FILTER ASSEMBLY WITH A FILTER ELEMENT

(71) Applicant: MANN+HUMMEL GMBH, Ludwigsburg (DE)

(72) Inventors: Panagiotis Mavroidakos, Remseck (DE); Guenter Jokschas, Murrhardt (DE); Ercan Sancar, Asperg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 103 days.

(21) Appl. No.: 14/523,881

(22) Filed: Oct. 25, 2014

(65) Prior Publication Data

US 2015/0114898 A1 Apr. 30, 2015

(30) Foreign Application Priority Data

Oct. 25, 2013 (DE) .......................... 10 2013 017 667

(51) Int. Cl.

| | |
|---|---|
| *B01D 35/00* | (2006.01) |
| *B01D 27/00* | (2006.01) |
| *B01D 39/10* | (2006.01) |
| *B01D 27/06* | (2006.01) |
| *F01M 11/03* | (2006.01) |
| *F01M 11/10* | (2006.01) |
| *B01D 35/147* | (2006.01) |
| *B01D 29/21* | (2006.01) |
| *B01D 29/54* | (2006.01) |

(52) U.S. Cl.
CPC .............. *F01M 11/03* (2013.01); *B01D 29/21* (2013.01); *B01D 29/54* (2013.01); *B01D 35/147* (2013.01); *F01M 11/10* (2013.01); *B01D 2201/0415* (2013.01); *B01D 2201/291* (2013.01); *B01D 2201/295* (2013.01)

(58) Field of Classification Search
CPC .............. F01M 2011/0066; F01M 2011/0029; F01M 2001/1092; B01D 29/114; B01D 35/147; B01D 2256/24; B01D 2201/0415; B01D 29/58; B01D 46/521
USPC .............................. 210/444, 493.1, 456, 492
See application file for complete search history.

(56) References Cited

U.S. PATENT DOCUMENTS

| | | | |
|---|---|---|---|
| 3,297,162 A | 1/1967 | Mouwen | |
| 5,225,081 A * | 7/1993 | Brownawell | ......... B01D 37/025 123/196 A |

(Continued)

FOREIGN PATENT DOCUMENTS

| | | |
|---|---|---|
| DE | 20006972 U1 | 8/2001 |
| DE | 20006974 U1 | 8/2001 |
| DE | 102010054349 A1 | 6/2011 |

*Primary Examiner* — Ana Fortuna
(74) *Attorney, Agent, or Firm* — James Hasselbeck

(57) ABSTRACT

A filter element for filtering a liquid medium has end plates and a filter material arranged between the end plates and flowed through by the liquid medium in a flow direction radial to a longitudinal axis of the filter element. A clean chamber is arranged in the flow direction downstream of the filter material and connected with an outlet of the filter element. A bypass duct for the liquid medium is provided that is fluidically connected by a bypass valve with the clean chamber. The bypass duct has an inlet in the first end plate. A support device is integrally formed on the first end plate and extends along the longitudinal axis away from the first end plate into the filter element interior. A sieve in the bypass duct separates solid materials from the liquid medium passing through the bypass duct. The sieve is attached to the support device.

11 Claims, 2 Drawing Sheets

(56) References Cited

U.S. PATENT DOCUMENTS

| | | | | |
|---|---|---|---|---|
| 5,374,355 A | * | 12/1994 | Habiger | B01D 29/114 210/440 |
| 5,888,383 A | * | 3/1999 | Cox | B01D 27/06 210/130 |
| 7,094,343 B2 | | 8/2006 | Moessinger | |
| 2013/0327429 A1 | * | 12/2013 | Ardes | B01D 35/147 137/599.11 |
| 2015/0114898 A1 | * | 4/2015 | Mavroidakos | F01M 11/03 210/340 |

* cited by examiner

FILTER ELEMENT WITH A BYPASS DUCT AS WELL AS FILTER ASSEMBLY WITH A FILTER ELEMENT

BACKGROUND OF THE INVENTION

The invention concerns a filter element for filtering a liquid medium, in particular motor oil or transmission oil. The filter element comprises a first end plate and a second end plate as well as a filter material or filter medium that is arranged between the two end plates and that can be flowed through by the liquid medium to be filtered in a flow direction that is radial to the longitudinal axis of the filter element. In the flow direction downstream of the filter element, a clean chamber of the filter element is arranged that is fluidically connected with a liquid medium outlet of the filter element. The filter element is provided with a so-called bypass duct or circumventing duct for the liquid medium by means of which the liquid medium, by bypassing the filter material, can be guided through the filter element. The bypass duct is fluidically connected by means of a bypass valve with the clean chamber and has an inlet for the liquid medium embodied by the first end plate. The bypass duct has a sieve associated therewith in order to separate solid materials from the liquid medium that is guided through the bypass duct. The invention concerns moreover a filter assembly with such a filter element.

It is known to employ filter elements in motor vehicles in which the medium to be filtered, not least for avoiding overpressure-caused damage of the filter material, is guided by means of the bypass duct past the filter material. This is, for example, necessary in case of oil filters when the liquid medium, i.e., for example, transmission oil or motor oil, is not yet liquid enough upon cold start of the motor vehicle, i.e., still has a viscosity that is too high in order to pass through the filter material. By means of this bypass a satisfactorily high medium flow via the filter element can be ensured in any case.

U.S. 2010/0126920 A1 discloses the provision of an overflow for embodying a bypass of the filter material. U.S. 2002/0074272 A1 proposes on the other hand to provide a pressure relief valve for bypassing a filter material.

Bypassing the filter material entails in principle the risk that the liquid medium after exiting from the filter element still contains larger dirt particles. U.S. 2004/0164008 A1 proposes therefore to arrange at a bypass valve a coarse-mesh sieve in order to filter out at least the coarser and coarse dirt particles from the medium to be filtered.

The arrangement of a sieve for coarse filtration of the medium to be filtered is also known from DE 10 2010 054 349 A1 and WO 2012/110411 A1. The known sieves are arranged in this context fluidically downstream of the bypass valve so that the bypass valve may be contaminated with dirt particles. This may lead to functional impairment of the bypass valve.

DE 200 06 972 U1 and DE 200 06 974 U1 disclose in contrast thereto the arrangement of a sieve fluidically upstream of the bypass valve. The sieve is arranged in a cover element that is clipped on seal-tightly from the exterior onto the end plate, provided with the inlet of the bypass duct, of the filter element. Accordingly, the bypass valve can be protected indeed from the negative effects of the coarse solid material contaminants in the liquid medium. However, at the same time the constructive height of the filter element is increased. Moreover, the required pressure-tight and fluid-tight sealing action of the sieve or of the cover element relative to the filter element is complex, expensive, and failure-prone.

SUMMARY OF THE INVENTION

It is the object of the invention to provide a filter element and a filter assembly of the aforementioned kind by means of which the aforementioned disadvantages of the prior art are overcome.

The object concerning the filter element is solved by a filter element wherein the sieve is attached to a support device which is integrally formed on the first end plate and which extends along the longitudinal axis of the filter element away from the end plate into the interior of the filter element.

The filter assembly according to the invention comprises a filter element as described that is inserted into the housing of the filter assembly.

The filter element according to the invention is characterized by a reliable separation (sieving) of solid material contaminants out of the liquid medium that is guided through the bypass duct. The first end plate together with the support device of the sieve can be produced in a single method step, for example, by injection molding. Additional mounting steps for attachment of the support device to the first end plate are obsolete. At the same time, the constructive height of the filter element is not affected by the arrangement of the sieve in accordance with the invention. Fluidic seal-tightness of the connection of the sieve on the support device itself with regard to high pressures of the liquid medium can be realized in a simple and inexpensive way.

The sieve according to the invention can be injection-molded section-wise into or onto the first end plate or the support device. The thus resulting form-fit arrangement of the sieve on the first end plate ensures a wear-free and fluid-tight seat of the sieve even at high pressures. According to an alternative further embodiment, the sieve, inasmuch as it is comprised of a thermoplastic synthetic material, can also be welded to the first end plate/support device.

The sieve is preferably manufactured of polyamide and, as needed, can be comprised of stainless steel. As a whole, dirt particles can be sieved safely from the medium to be filtered in this way, even in case of corrosive liquid media.

In a particularly preferred embodiment of the invention, the sieve has an average pore size or mesh width between 10 micrometers and 500 micrometers, in particular between 50 micrometers and 200 micrometers. The average pore size or mesh width of the sieve is preferably approximately ten times as large as the average pore size of the filter material. Accordingly, a satisfactory filtration of the liquid medium as well as a continuous particle-free flow of the liquid medium, when it has a high viscosity, can be ensured.

According to a preferred further embodiment of the invention, the sieve is tubular in order to provide a large (active) sieving surface. In this context, the inlet of the bypass duct is preferably connected fluidically with the outer wall surface of the sieve. The liquid medium thus flows through the sieve "from the exterior to the interior" upon use of the filter element and is freed from coarser or coarse solid material particles in this way.

A constructively particularly simple configuration and, at the same time, a robust configuration relative to mechanical loads of the filter element can be achieved in that the support device is embodied as a first support tube provided with an exterior wall surface on which the filter material is resting. The support tube fulfills thus a dual function and supports additionally the inner side of the filter material. For supporting the filter material across its entire length extension, the first support tube can extend up to the second end plate of the filter element. For functional reasons, a satisfactorily large flow-through possibility must be present on the support tube.

Alternatively, on the second end plate a second support tube can be arranged, in particular integrally formed. The second support tube extends in this context in analogy to the first support tube away from the second end plate in axial direction into the interior of the filter element, i.e., in the direction toward the first end plate. The filter material in this case is resting on the exterior wall surface of the second support tube.

A particularly robust and cost-effective configuration of the filter element according to the invention can be realized in that the second end plate element is connectable with the first end plate element by a snap-on connection. In a particularly simple embodiment of the filter element, the two end plates can be locked with each other by means of the two aforementioned support tubes. In this way, a separate connecting element is not needed and mounting of the filter element is facilitated.

With respect to constructive as well as manufacturing technological aspects, the second end plate forms preferably the outlet of the filter element. In this way, particularly large flow cross-sections for the liquid medium can be realized in the filter element.

According to the invention, the bypass valve or pressure relief valve can advantageously comprise a valve part or a closure part that is axially slidably arranged between a closed position and an open position wherein the closure part in the closed position is seal-tightly resting on the first support tube or on the first end plate and is supported on the second support tube by a spring element that is under pretension. In this way, a particularly simple configuration of the bypass valve results that is only minimally susceptible to disruptions. The spring element in this context is preferably in the form of a spiral spring. By means of the spring element, a defined opening pressure of the bypass valve can be preadjusted in a simple way.

A high sealing capability with simultaneous simple constructive configuration of the bypass valve can be achieved in that the closure part at the first end that is pointing toward the first end plate is configured like a mushroom head.

According to the invention, the closure part can be slidably guided in a guide cutout of the second end plate or of the second support tube of the second end plate. For facilitating mounting of the filter element, the closure element can be provided in this context with one or several securing elements by means of which an undesirable axial removal or falling out of the closure part from the guide cutout is prevented. This is advantageous for mounting the filter element.

In summary, the invention concerns a filter element in which an overpressure of a liquid medium to be filtered can be diverted by a bypass valve. A sieve is fluidically arranged upstream of the bypass valve so that the medium to be filtered contains no coarse dirt particles even when it is guided by means of the bypass duct through the filter element. The filter element has a filter material that is secured between two end plates wherein, for discharging the overpressure, the first end plate has an inlet that guides the liquid medium to the tubular sieve and farther to the pressure relief valve. The sieve is attached to a support device that is formed integrally on the first end plate and that extends along the longitudinal axis of the filter element from the end plate into the interior of the filter element. The sieve can be in particular fixedly cast with the end plate element that is formed of plastic material. A particularly low constructive height of the filter element can be achieved in this context when the sieve is tubular and is fastened at the first end plate central and parallel to the filter material that is oriented in the longitudinal direction of the filter element.

The object according to the invention is moreover solved by a filter assembly with a housing and with a filter element as described above and that is inserted into the housing.

Further features and advantages of the invention result from the following detailed description of an embodiment of the invention with the aid of the figures of the drawing, showing details that are essential to the invention, as well as from the claims.

The features illustrated in the drawing are not necessarily to be understood as being to scale and are illustrated such that the special features according to the invention are made clearly visible. The various features can be realized individually, or several of them in any combination, in variants of the invention.

In the schematic drawing one embodiment of the invention is illustrated and explained in detail in the following description.

DESCRIPTION OF PREFERRED EMBODIMENTS

Figure 1:
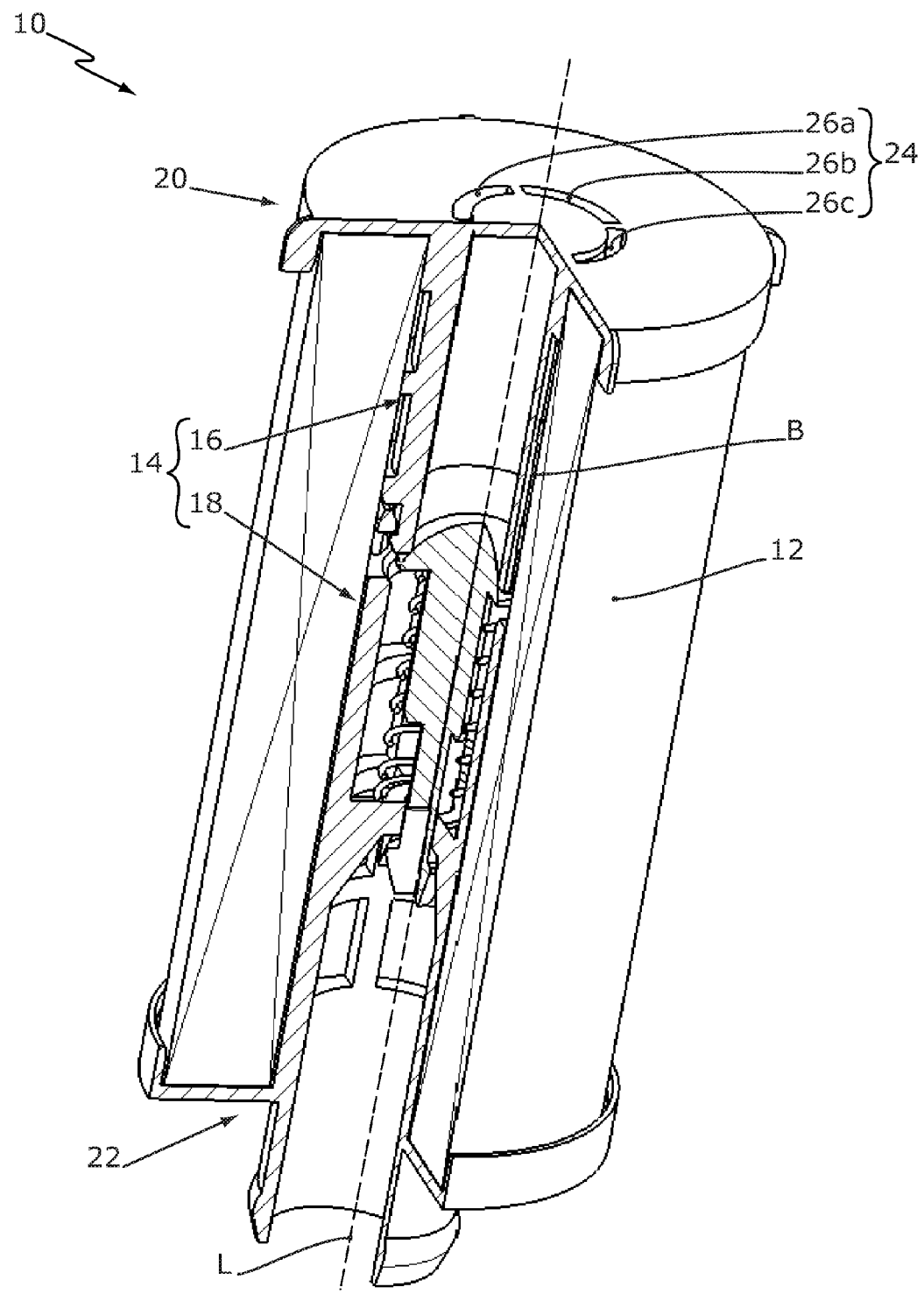
FIG. 1 is a partially sectioned perspective view of the filter element.

FIG. 1 shows a filter element 10 according to the invention for filtering a liquid medium, such as, for example, motor oil or transmission oil of an oil circuit of a motor vehicle. The filter element 10 comprises a filter material 12 that is embodied in the form of a textile filter folded multiple times. The filter material 12 is arranged in a circular shape around the entire circumference of a central tube 14 of the filter element 10. The central tube 14 is concentrically arranged relative to the longitudinal axis L of the filter element 10. As shown in FIG. 1, the central tube 14 in the present case is comprised of two parts, i.e., a first support tube 16 and a second support tube 18. The first support tube 16 is a part of the first end plate 20 of the filter element, i.e., the first support tube 16 is integrally formed on the first end plate 20 of the filter element 10. Accordingly, the second support tube 18 is a part of a second end plate 22 of the filter element 10 and integrally formed thereon. The support tubes 16, 18 extend away from the respective end plates 20, 22 in axial direction into the interior of the filter element 10. The two end plates 20, 22 serve with their sections that are embodied as support tubes 16, 18 as a cylindrical contact and support surface for the filter material 12 in order to protect it from collapse. Moreover, the two end plates 20, 22 also serve as covers which secure and enclose (engage across) the filter material 12 in longitudinal direction of the filter element 10.

The end plates 20, 22 are each of a monolithic configuration in order to facilitate manufacture and assembly of the filter element 10.

The filter material 10 is provided with a bypass duct B for the liquid medium via which the liquid medium, by bypassing the filter material 12, can be guided through the filter element 10. The first end plate 20 delimits an inlet 24 of the bypass duct B that in the present case comprises, for example, a first opening 26a, a second opening 26b, a third opening 26c as well as a fourth opening, which is not visible as a result of the section view according to FIG. 1. The openings 26a, 26b, 26c as well as the fourth opening are arranged one after another in a circular arc shape about the longitudinal axis L. The inlet 24 serves for discharging overpressure at the filter element 10.

The openings may not be too small. A satisfactory flow-through capability must be ensured.

Figure 2:
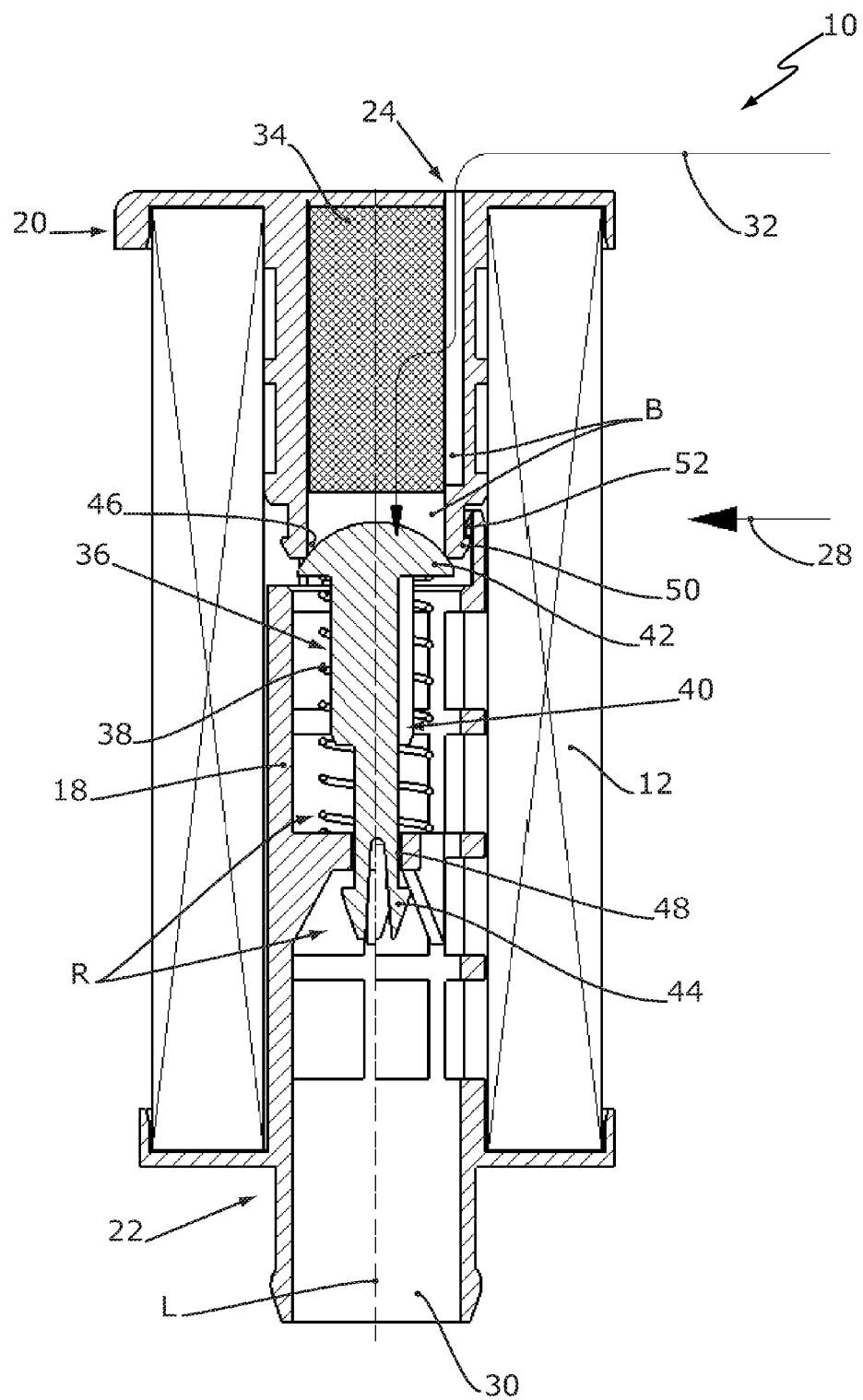
FIG. 2 is a completely sectioned side view of the filter element of FIG. 1.

FIG. 2 shows the filter element 10 in a sectioned side view. The filter material 12 in operation, i.e., when it is inserted into a housing (not illustrated) of a filter assembly, is flowed through by the liquid medium transverse to the longitudinal axis L of the filter element 10, i.e., in a flow direction 28 which is radial to the longitudinal axis L. The filter element 10 has a clean chamber R which in flow direction 28 is arranged downstream of the filter material 12 in the interior of the filter element 10. The clean chamber R is fluidically connected with an outlet 30 of the filter element 10 by means of which the liquid medium can be discharged from the first filter element 10.

However, when the liquid medium is cold, for example, it has a high viscosity so that a satisfactory flow through the filter medium 12 at normal operating pressures cannot be ensured. In this case, the pressure of the unfiltered liquid medium in the flow direction 28 increases upstream of the filter material 12. The liquid medium flows than in the direction of a second arrow 32 via the inlet 24 into the bypass duct B, as will be explained in more detail in the following.

As shown in FIG. 2, the bypass duct B is provided with a sieve 34 by means of which coarser contaminants are separated from the liquid medium that is guided through the bypass duct B. The sieve 34 therefore ensures that the liquid medium guided through the filter element 10 in any operational state of the filter element 10 is freed at least from coarser/coarse particulate contaminants.

The sieve 34 is form-fittingly injection-molded sectionwise onto or into the first end plate 20 formed of plastic material or the support tube 16 functioning as a support device. The sieve 34 in the embodiment illustrated herein is tubular and projects away from the first end plate 20 in axial direction into the interior of the filter element 10. In this way, no additional constructive height for the sieve 34 must be provided on the filter element 10.

The bypass duct B is fluidically connected by means of a bypass valve 36 with the clean chamber R and the outlet 30 of the filter element 10. The bypass valve 36 is embodied as a one-way pressure relief valve and has a defined opening pressure.

The bypass valve 36 comprises a valve part or closure part 40 whose first end 42 is embodied with a mushroom head configuration and whose second end 44 is provided with several barb-like securing elements 44. In the illustrated closed position of the bypass valve 36, the first end 42 seals an outlet 46 of the bypass duct B that is embodied by the support tube 16 of the first end plate 20.

For establishing the pretensioned contact of the closure part 40 on the first end plate 20, a spring element 38 is provided that is supported with one end on the bottom side of the first end 42 of the closure part 40 and with the other end on the second support tube 18 in the area of a guide cutout 48 of the second support tube 18. The closure part 40 extends through the guide cutout 48 and is axially slidably supported therein relative to the two end plates 20, 22.

When assembling the filter element 10, the closure part 40 is inserted into the guide cutout 48 wherein the closure part 40 by means of the barb-like securing elements 44 locks with axial play at the support tube 18 of the second end plate 22.

The first end plate 20 has at its first support tube 16 furthermore a first locking projection 50 which is locked upon assembly of the filter element 10 with a second locking projection 52 of the second support tube 18 of the second end plate 22. The filter element 10 can therefore be simply plugged together for assembly.

When the unfiltered liquid medium that is under pressure surpasses the opening pressure of the bypass valve 36, the bypass valve 36 is actuated. The closure part 40 of the bypass valve 36 is axially displaced against the force of the spring element 38 out of the closed position illustrated in FIG. 2 into an open position, not illustrated in detail, in the direction of the second end plate 22. Accordingly, a passage for the liquid medium through the bypass duct B into the clean chamber R is opened. The sieved liquid medium is then guided via the outlet 30 out of the filter element 10. As soon as the pressure of the unpurified liquid medium that is acting externally on the filter material 12 drops below the predetermined opening pressure of the bypass valve 36, the bypass valve 36 will automatically close. The liquid medium flows than exclusively via the filter material 12 into the filter element 10.

While specific embodiments of the invention have been shown and described in detail to illustrate the inventive principles, it will be understood that the invention may be embodied otherwise without departing from such principles.

What is claimed is:

1. A filter element for filtering a liquid medium, the filter element comprising:
   a first end plate and a second end plate;
   a filter material arranged between the first and second end plates and adapted to be flowed through by the liquid medium in a flow direction that is radial to a longitudinal axis of the filter element;
   a clean chamber arranged in the flow direction downstream of the filter material and connected fluidically with an outlet of the filter element;
   a bypass duct for the liquid medium, the bypass duct fluidically connected by a bypass valve with the clean chamber, and the bypass duct comprising an inlet that is embodied by the first end plate;
   a support device integrally formed on the first end plate and extending along the longitudinal axis of the filter element away from the first end plate into an interior of the filter element;
   a sieve disposed in the bypass duct and adapted to separate solid materials from the liquid medium passing through the bypass duct, wherein the sieve is attached to the support device.

2. The filter element according to claim 1, wherein the sieve is injection-molded onto the support device or is welded to the support device.

3. The filter element according to claim 1, wherein the sieve is embodied at least section-wise in a tubular shape.

4. The filter element according to claim 1, wherein the support device is a first support tube provided with a first exterior wall surface, wherein the filter material is resting on the first exterior wall surface at least section-wise.

5. The filter element according to claim 4, wherein on the second end plate a second support tube for the filter material is integrally formed and provided with a second exterior wall surface, wherein the filter material is resting on the second exterior wall surface.

6. The filter element according to claim 5, wherein the first and second support tubes are locked with each other to connect the first and second end plates to each other.

7. The filter element according to claim 5, wherein the bypass valve comprises a closure part that has a closed position and an open position and is arranged so as to be axially slidable between the closed position and the open position, wherein the closure part in the closed position is resting seal-tightly on the first support tube and is supported on the second support tube with a spring element that is under pretension.

8. The filter element according to claim 7, wherein the second support tube comprises a guide cutout and the closure part is arranged and guided in the guide cutout, wherein the closure part comprises an end with a securing element.

9. The filter element according to claim 1, wherein the first and second end plates are locked with each other.

10. The filter element according to claim 1, wherein the outlet of the filter element is provided on the second end plate.

11. A filter arrangement comprising a housing and further comprising a filter element according to claim 1, wherein the filter element is arranged in the housing.

* * * * *